US012611933B2

(12) United States Patent
Harmon et al.

(10) Patent No.: US 12,611,933 B2
(45) Date of Patent: Apr. 28, 2026

(54) REMOVABLE AND DOCKABLE DISPLAY

(71) Applicant: Ford Global Technologies, LLC, Dearborn, MI (US)

(72) Inventors: Michael John Harmon, Northville, MI (US); Leyna Hirsch, Livonia, MI (US); Hussain Z. Tajmahal, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 18/244,536

(22) Filed: Sep. 11, 2023

(65) Prior Publication Data

US 2025/0083524 A1    Mar. 13, 2025

(51) Int. Cl.
*B60K 35/50* (2024.01)
*B60K 35/22* (2024.01)

(52) U.S. Cl.
CPC .............. *B60K 35/50* (2024.01); *B60K 35/22* (2024.01); *B60K 2360/40* (2024.01); *B60K 2360/691* (2024.01); *B60K 2360/816* (2024.01); *B60K 2360/828* (2024.01)

(58) Field of Classification Search
CPC ......... B60K 35/50; B60K 35/53; B06K 36/65
USPC ....... 348/373, 368, 14.07, 61; 386/358, 359, 386/362
See application file for complete search history.

(56) References Cited

U.S. PATENT DOCUMENTS

| | | | |
|---|---|---|---|
| 6,785,531 B2 | 8/2004 | Lepley et al. | |
| 7,561,070 B2 * | 7/2009 | Rhodes ................ | G01C 21/265 |
| | | | 340/995.14 |
| 7,852,622 B2 * | 12/2010 | Ferren ................... | B60K 35/10 |
| | | | 361/679.04 |
| 9,162,574 B2 | 10/2015 | Kolodziej | |
| 9,610,957 B2 | 4/2017 | Baalu et al. | |
| 2011/0099316 A1 | 4/2011 | Tseng et al. | |
| 2013/0245882 A1 | 9/2013 | Ricci | |
| 2023/0129916 A1 * | 4/2023 | Lee ..................... | B60R 11/0229 |
| | | | 701/36 |
| 2024/0131929 A1 * | 4/2024 | Inoue ................. | B60R 11/0235 |

FOREIGN PATENT DOCUMENTS

EP            3705332 A1    7/2019

* cited by examiner

*Primary Examiner* — Daquan Zhao
(74) *Attorney, Agent, or Firm* — Vichit Chea; Price Heneveld LLP

(57) ABSTRACT

A device assembly of a vehicle that includes a display housing where a display is attached to the front of the housing and a receiver is attached to the rear of the housing. The receiver couples to a receiver mount on the vehicle. An interlock connection exists between the display housing and the receiver mount. When the interlock connection is locked, triggered by the car being in a dynamic state, the display housing cannot be slidably decoupled from the receiver mount. When the interlock connection is unlocked, triggered by the vehicle being in a static state, the display housing can be slidably decoupled from the receiver mount.

20 Claims, 12 Drawing Sheets

REMOVABLE AND DOCKABLE DISPLAY

FIELD OF THE DISCLOSURE

The present disclosure generally relates to a display system, in particular, a display system for a vehicle.

BACKGROUND OF THE DISCLOSURE

Vehicles are often equipped with a display system configured to provide infotainment to the vehicle's occupants (e.g., configured to relay vehicle sensor data, provide access to real-time information such as navigation, allow occupants to adjust vehicle or device settings like lighting, Bluetooth® connectivity, or driver profile preferences, provide an integrated interface for servicing the vehicle, as well as stream content such as videos or games to the vehicle's occupants). These display systems are often integrated into the vehicle's dashboard or center console and are designed to provide access to information and/or entertainment for the driver and passengers of the vehicle.

SUMMARY OF THE DISCLOSURE

According to a first aspect of the present disclosure, a device assembly of a vehicle is provided. The device assembly includes a display housing including a front portion and a rear portion opposing the front portion, a display coupled to the front portion, and a receiver disposed on the rear portion, wherein the receiver is couplable to a receiver mount that is coupled to the vehicle. The device assembly also includes an interlock connection defined between the display housing and the receiver mount, wherein the interlock connection has a locked condition. The locked condition preventing the display housing from being slidably decoupled when the vehicle is in a dynamic state, and wherein the interlock connection has an unlocked condition, the unlocked condition allowing the display housing to be slidably decoupled when the vehicle is in a static state.

Embodiments of the first aspect of the present disclosure can include any one or a combination of the following features:
    at least one housing connection pin disposed on the rear portion, and at least one receiver mount connection pin disposed on the receiver mount, wherein the at least one receiver mount connection pin is configured to engage with the at least one housing connection pin, thereby permitting data transfer along the engagement, and wherein the engagement between the at least one receiver mount connection pin and the at least one housing connection pin defines the interlock connection;
    the receiver slidably couples with the receiver mount through a receiver recess defined on a central region of the rear portion, and wherein the receiver recess extends from one edge of the rear portion towards a center section of the rear portion;
    a release lever disposed within the receiver recess, the release lever being movable between an engaged position and a disengaged position, wherein the release lever includes a handle that extends beyond a bottom portion of the display housing;
    a locking pin coupled to the receiver mount, the locking pin being movable between a locked position and an unlocked position, wherein the locking pin extends into a receiver pin recess that is defined on the rear portion of the display housing;

the locking pin is recessed into the receiver mount in the unlocked position, and wherein an engagement between the locking pin and the display housing defines the interlock connection;
    the receiver mount comprises at least one of a primary receiver mount or an auxiliary receiver mount or, and wherein the primary receiver mount is disposed in an interior of the vehicle, and wherein the auxiliary receiver mount is couplable to front storage compartment or a rear storage compartment of the vehicle, and wherein an engagement between the display housing and the primary receiver mount defines a first interlock connection and the engagement between the display housing and the auxiliary receiver mount defines a second interlock connection;
    a receiver mount arm couplable to the receiver mount, wherein the receiver mount arm includes at least one pivot joint.

According to a second aspect of the present disclosure, a device assembly of a vehicle is provided. The device assembly includes a display housing including a front portion and a rear portion opposing the front portion, a display coupled to the front portion, a receiver disposed on the rear portion. The receiver includes a receiver recess extending from one edge of the rear portion towards a center section of the rear portion, wherein the receiver is configured to be slidably coupled to a receiver mount coupled to a vehicle, and an interlock connection between the display housing and the receiver mount. The interlock connection has a locked condition. The locked condition preventing the display housing from being slidably decoupled when the vehicle is in a dynamic state, and wherein the interlock connection has an unlocked condition. The unlocked condition allowing the display housing to slidably decoupled when the vehicle is in a static state. The device assembly also includes a controller in communication with the interlock connection. The controller is configured to output a signal to actuate the interlock connection to a locked condition in response to a detected dynamic state of the vehicle, and the controller is configured to output a signal to actuate the interlock connection to an unlocked condition in response to a detected static state of the vehicle.

Embodiments of the second aspect of the present disclosure can include any one or a combination of the following features:
    at least one housing connection pin disposed on the rear portion, and at least one receiver mount connection pin disposed on the receiver mount. The at least one receiver mount connection pin is configured to engage with the at least one housing connection pin, thereby defining the interlock connection, and wherein the engagement between the at least one housing connection pin and the at least one receiver mount connection pin permits data transfer along the engagement;
    a release lever disposed within the recess movable between an engaged position and a disengaged position, wherein the release lever includes a handle that extend beyond a bottom portion of the housing;
    a locking pin coupled to the receiver mount, the locking pin being movable between a locked position and an unlocked position, wherein the locking pin extends into a receiver pin recess that is defined on the rear portion of the display housing;
    an engagement between the locking pin and the display housing defines the interlock connection, and wherein the controller is configured to actuate the controller to the locked position to define the locked condition, and wherein the controller is configured to actuate the locking pin to the unlocked position to define the unlocked condition;

the receiver mount includes at least one of a primary receiver mount or an auxiliary receiver mount, and wherein the primary receiver mount is disposed in an interior of the vehicle. The auxiliary receiver mount is couplable to front storage compartment or a rear storage compartment of the vehicle, and wherein an engagement between the display housing and the primary receiver mount defines a first interlock connection and the engagement between the display housing and the auxiliary receiver mount defines a second interlock connection;

a receiver mount arm coupled to the receiver mount;

the receiver mount arm includes a shoulder coupled to the vehicle, a first link coupled to the shoulder, an elbow joint coupled to the first link and a second link, and a wrist coupled to the second link and the receiver mount; and the receiver mount arm includes a pair of receiver mount arm supports on opposing sides of the receiver mount arm.

According to a third aspect of the present disclosure, a device assembly of a vehicle is provided. The device assembly includes a display housing including a front portion and a rear portion opposing the front portion, a display coupled to the front portion, a receiver disposed on the rear portion, at least one housing connection pin disposed on the receiver, and a receiver mount couplable to the receiver, the receiver mount coupled to the vehicle. The device assembly also includes at least one receiver mount connection pin disposed on the receiver mount, wherein the at least one receiver mount connection pin is configured to engage with the at least one housing connection pin. The device assembly further includes a controller in communication with the at least one housing connection pin and the at least one receiver mount connection pin, wherein the controller is configured to output a first signal to at least one of the at least one receiver mount connection pin or the at least one housing connection pin to define a fixed engagement between the at least one receiver mount connection pin and the housing connection pin in response to a first condition. The controller is configured to output a second signal to at least one of the at least one receiver mount connection pin or the at least one housing connection pin to define a decouplable engagement between the at least one receiver mount connection pin and the housing connection pin in response to a second condition, wherein the controller is configured to determine the first condition in response to at least one of a static state of the vehicle or a detected authorized use condition, and wherein the controller is configured to determine the second condition in response to at least one of a detected dynamic state of the vehicle or a detected unauthorized use condition.

Embodiments of the third aspect of the present disclosure can include any one or a combination of the following features:

a release lever disposed on rear portion of the display housing, wherein the release lever includes a handle extending beyond a bottom portion of the display housing and an engagement section opposing the handle, and wherein the engagement section is couplable to a bottom segment of the receiver mount; and a locking pin coupled to the receiver mount, the locking pin being movable between a locked position and an unlocked position, wherein the locking pin extends into a receiver pin recess that is defined on the rear portion of the display housing. The controller is configured to actuate the locking pin to the locked position in response to the first condition, and wherein the controller is configured to actuate the locking pin to the unlocked position in response to the second condition. The locking pin is recessed into the receiver mount in the unlocked position and the locking pin is extended into the rear portion of the display housing in the locked position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
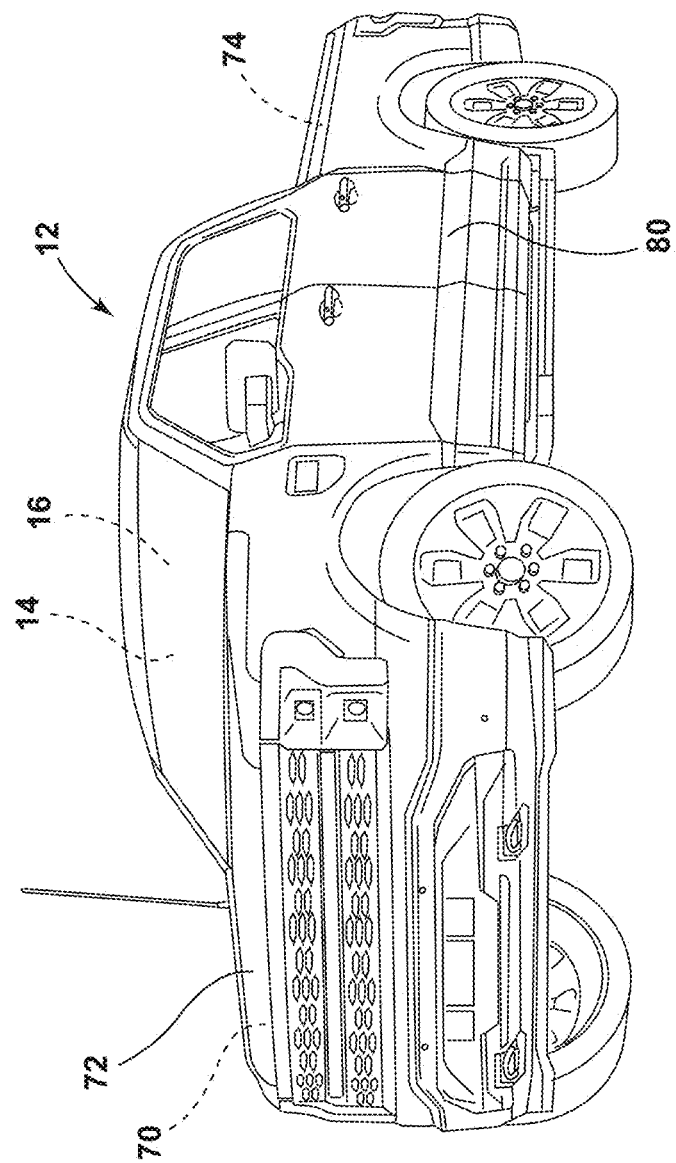
FIG. 1 is a perspective view of the vehicle, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper." "lower," "right." "left." "rear," "front." "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a removable and dockable display for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises." "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Hereinafter the term "frunk" is a portmanteau of the words "front" and "trunk" that refers to the storage space under the hood of the car that has traditionally been occupied by an internal combustion engine, but may not in the case the vehicle has a rear-mounted engine or is an electric vehicle.

Hereinafter, the term "interlock connection" refers to a mechanism that prevents the mechanical decoupling of two components. This prevention can be by way of a tumbler, pin, or other obstruction that prevents decoupling of two components.

Referring now to FIGS. 1-6, depicted is a vehicle 12 with a vehicle interior 14 that defines a passenger compartment 16. The passenger compartment 16 includes one or more device assemblies 10. The device assembly 10 includes a display housing 18 that has a front portion 20 and a rear portion 22 opposing the front portion 20. A display 24 is coupled to the front portion 20. A receiver 26 is disposed on the rear portion 22. The receiver 26 further defines a recess 28. The recess 28 extends from a bottom portion 30 of the display housing 18 towards a center section 32 of the rear portion 22. The receiver 26 is configured to be slideably coupled to a receiver mount 34 that is coupled to a body 36 in the vehicle 12. An interlock connection 38 is defined between the display housing 18 and the receiver mount 34. The interlock connection 38 is operable between a locked condition 40 and an unlocked condition 42. In the locked condition 40, the display housing 18 is fixedly coupled to the receiver mount 34. In the unlocked condition 42, the display housing 18 is slideably decouplable from the receiver mount 34.

The device assembly 10 is in communication with a controller 44. The controller 44 is in communication with the interlock connection 38 such that the controller 44 may output a signal that actuates the locked condition 40 of the interlock connection 38, and/or the controller 44 may output another signal that actuates the unlocked condition 42 of the interlock connection 38. The controller 44 is configured to output a signal to actuate the locked condition 40 in response to a detected dynamic state of the vehicle 12. The controller 44 is also configured to output a signal to actuate the unlocked condition 42 in response to a detected static state of the vehicle 12.

Figure 2:
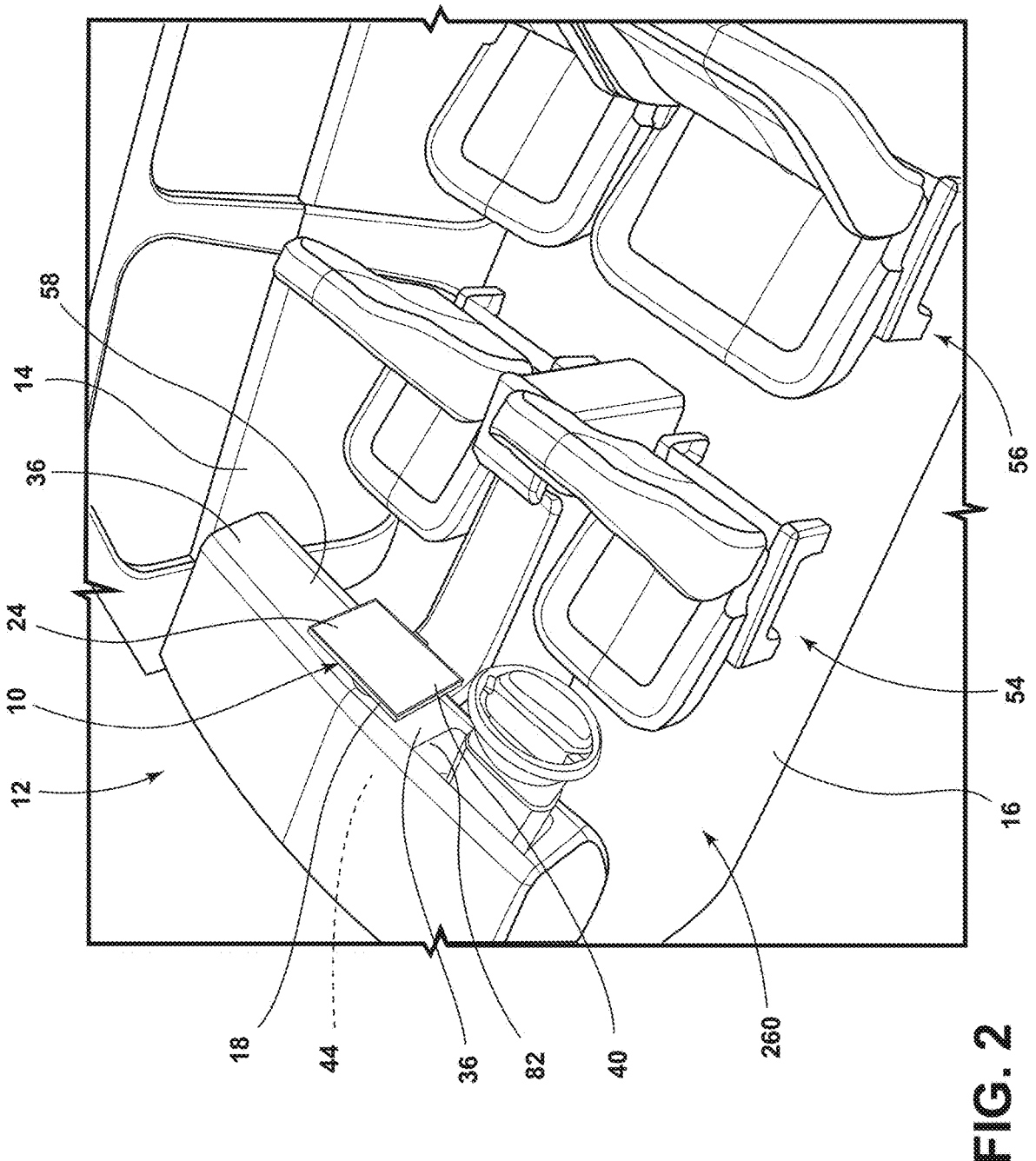
FIG. 2 is a perspective view of the vehicle interior with the display housing attached to the receiver mount, according to one embodiment.
Figure 3:
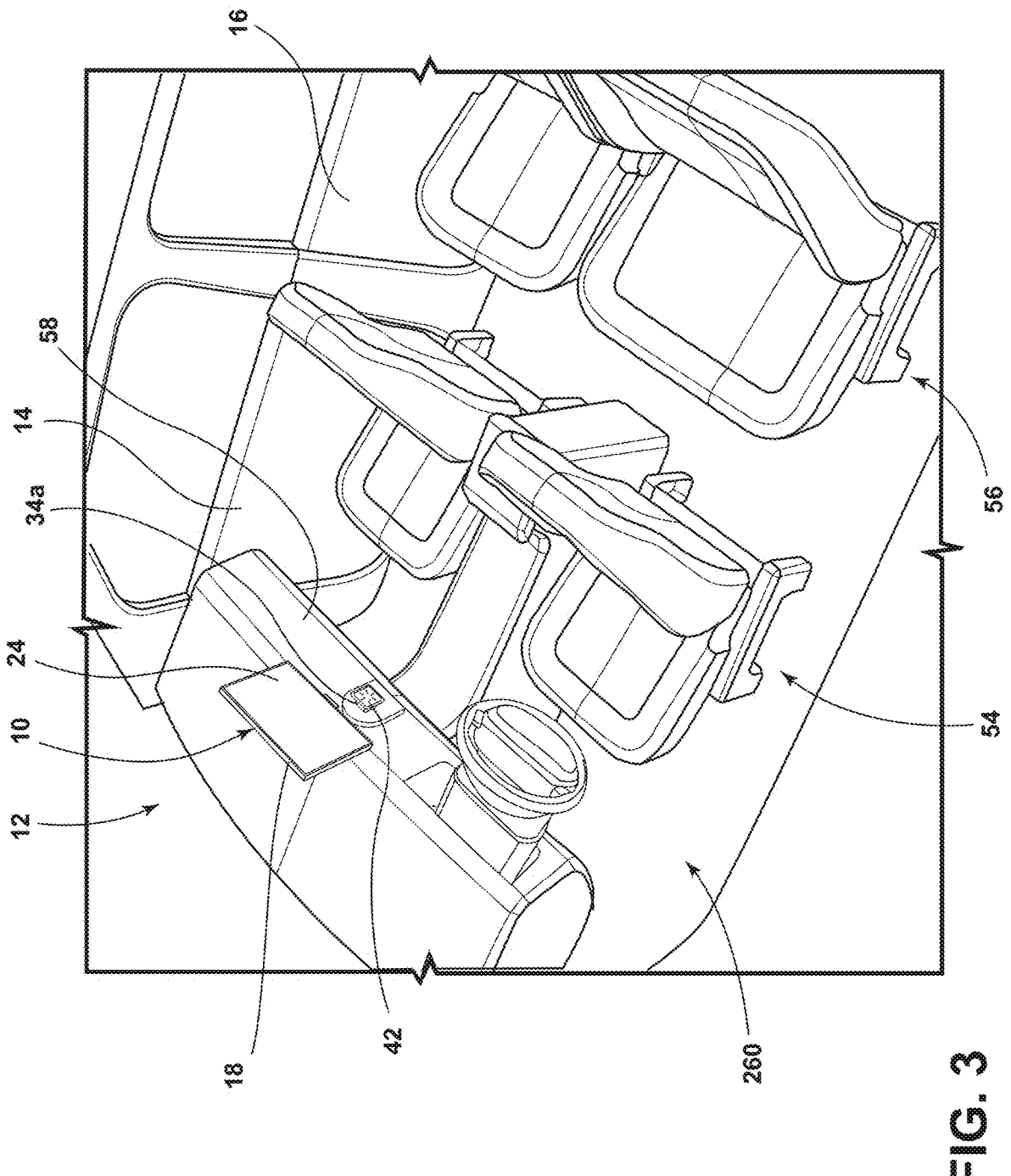
FIG. 3 is a perspective view of the vehicle interior with the display housing removed from the receiver mount, according to one embodiment.
Figure 4:
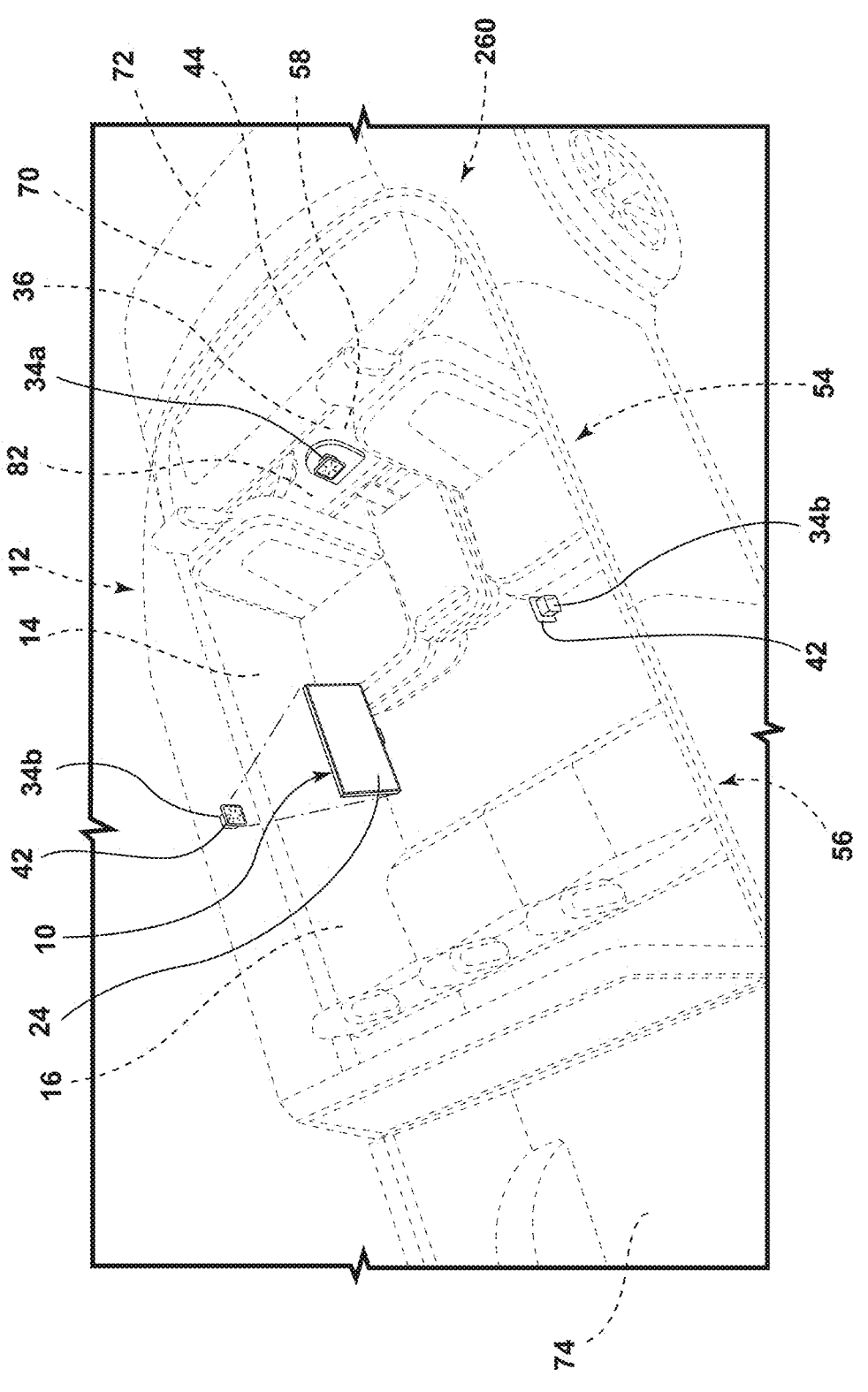
FIG. 4 is a perspective view of the vehicle interior with primary and auxiliary receiver mounts, according to one embodiment.

Referring now to FIGS. 2-4, the vehicle interior 14 includes the passenger compartment 16 therein contained within the vehicle 12. The passenger compartment 16 may include a first seating row 54 and a second seating row 56. Fewer or more seating rows may be included in the passenger compartment 16 without departing from the teachings herein. The first seating row 54 may include a driver seat and a passenger seat. The driver and passenger seats may be separated by a vehicle armrest, which may be coupled to a center console. The second seating row 56 may include rear passenger seats. The rear passenger seats of the second seating row 56 may include bucket seating or may be bench seating. As illustrated, the second seating is bench seating that includes a first rear passenger seat, a second rear passenger seat, and a third rear passenger seat. The device assembly 10, as illustrated in FIG. 2, is disposed on an instrument panel 58 that is vehicle forward of the first seating row 54. While the vehicle 12, as illustrated in FIG. 2, has the device assembly 10 disposed on the instrument panel 58 in the passenger compartment 16, it is contemplated that the device assembly 10 may be positioned in any practical location within the passenger compartment 16 of the vehicle interior 14 without departing from the teachings herein.

In various examples, the passenger compartment 16 is a passenger compartment that may be within the vehicle interior 14 of a sedan, a sport utility vehicle (SUV), a truck, a van, a crossover, and/or other styles of vehicles. The passenger compartment 16 may be within the vehicle interior 14 of a manually operated vehicle (e.g., with a human driver), a fully autonomous vehicle (e.g., no human driver), or a partially autonomous vehicle (e.g., may be operated with or without a human driver).

Figure 5:
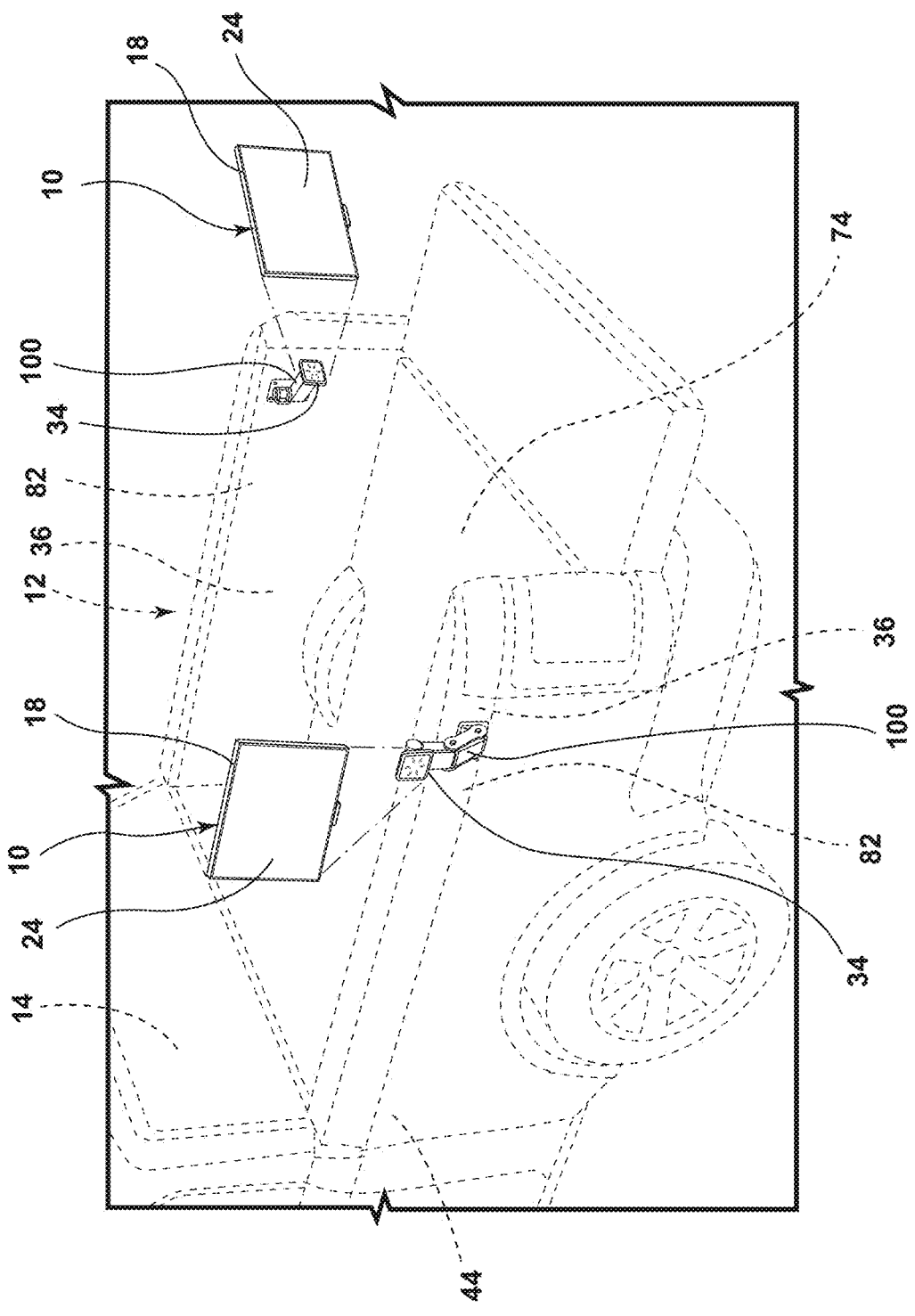
FIG. 5 is a perspective view of the vehicle exterior and cargo area with auxiliary receiver mounts, according to one embodiment.
Figure 6:
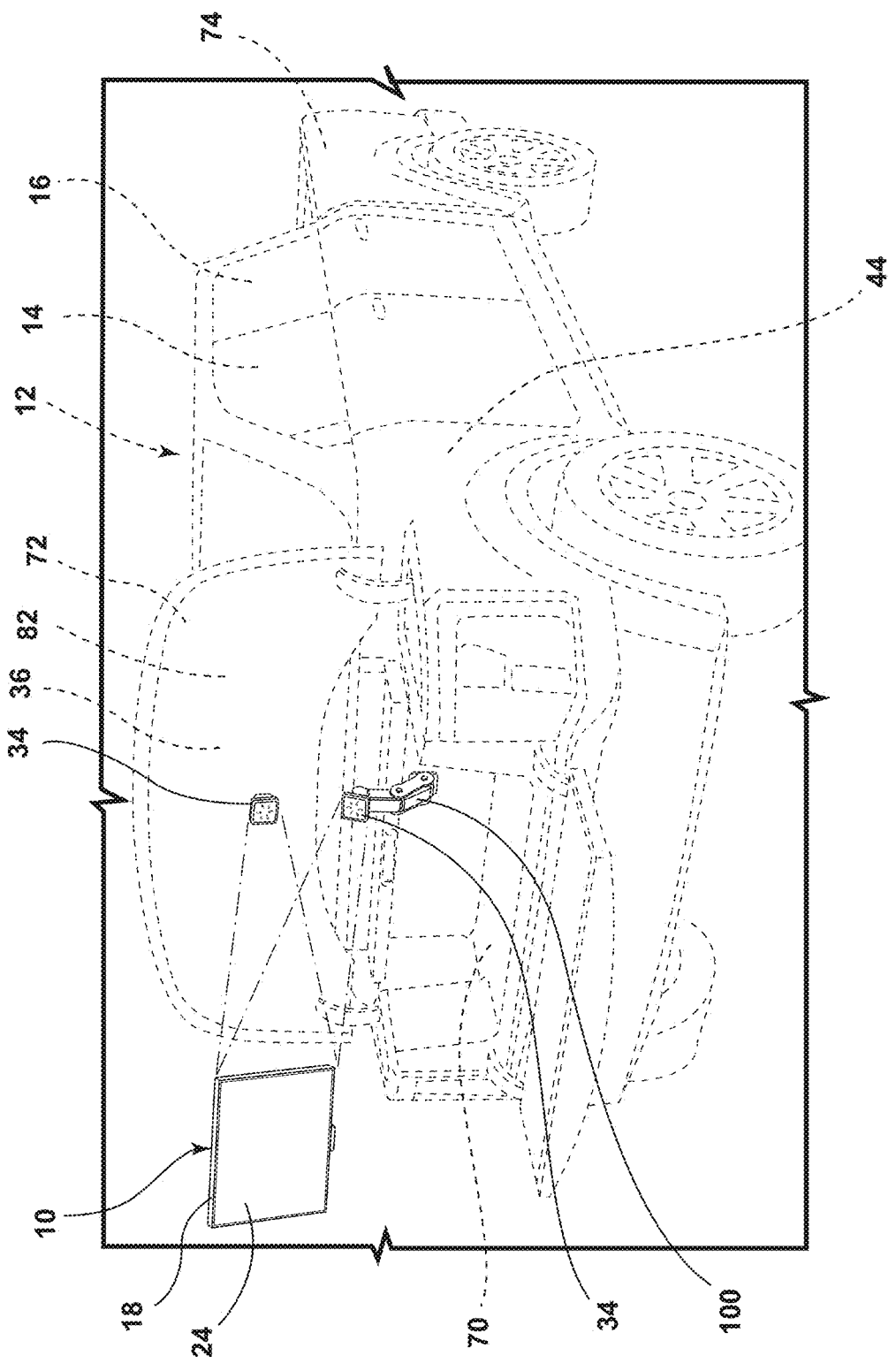
FIG. 6 is a perspective view of the vehicle cargo area with auxiliary receiver mounts, according to one embodiment.

Referring now to FIGS. 5 and 6, the vehicle 12 includes one or more storage compartments. The vehicle 12 may include a front trunk 70 at a front end of the vehicle 12 that is operably accessible via a vehicle hood 72 and a cargo bed 74 extending rearward from the vehicle interior 14. As illustrated in FIGS. 5 and 6, the device assembly 10 may be disposed in or near the front trunk 70 of the vehicle 12 and/or near or in the cargo bed 74 of the vehicle 12. Additionally, or alternatively, the device assembly 10 may be disposed in, or coupled to, various locations throughout the vehicle 12 without departing from the teachings herein.

Referring to FIGS. 1-6, the display assembly 10 is coupled to a body 36. In some embodiments, the body 36 is shown herein as an aspect of the vehicle 12. For example, the body 36 may be a pillar, a vehicle panel, the hood 72, the cargo bed 74, the instrument panel 58, and/or various other aspects of the vehicle 12. The body 36 may define a receiving surface 82. According to various aspects, the receiving surface 82 of the body 36 is configured to couple to the receiver mount 34 or a portion thereof, as provided herein. Additionally, in various aspects, the vehicle 12 includes a plurality of bodies 36 throughout the vehicle 12 such that a plurality of receiver mounts 34 can be disposed throughout the vehicle 12. In such aspects, the display housing 18 with the display 24 can be coupled to various bodies 36 throughout the vehicle 12.

Referring now to FIGS. 1-9 and 11-16, the receiver mount 34 is coupled to the body 36. In some examples, the receiver mount 34 is directly coupled to the body 36 via one or more fasteners, such as a bolt, welding, an adhesive, and/or one or more various kinds of fasteners. In such examples, the receiver mount 34 can be fixedly coupled to the body 36 and/or rotationally coupled to the body 36. For example, the receiver mount 34 can be coupled to the body 36 such that the receiver mount 34 can be rotated about a center axis, as provided herein.

Figures 7, 8:
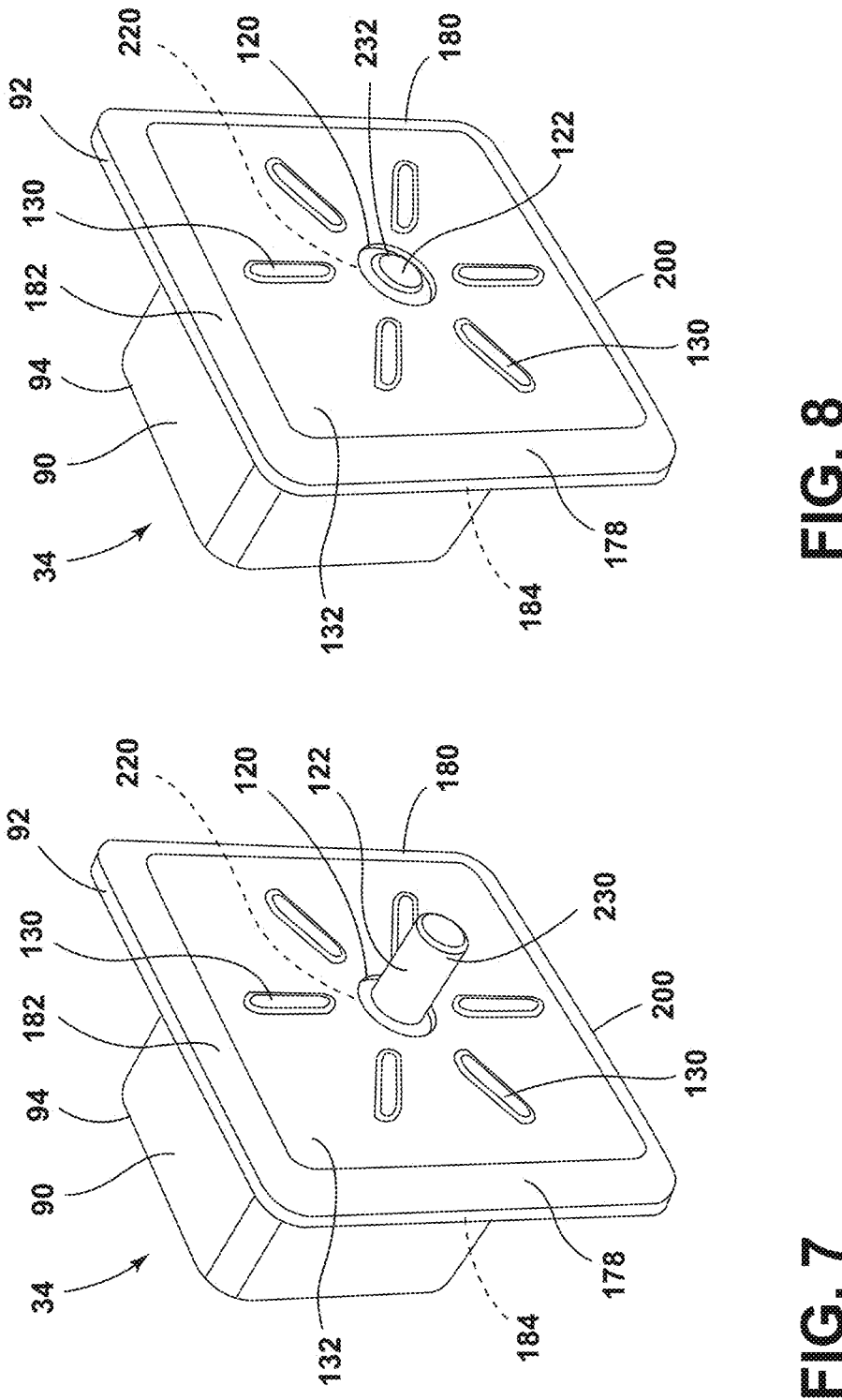
FIG. 7 is a perspective view of the receiver mount with a locking pin extending from the receiver mount, according to one embodiment.
FIG. 8 is a perspective view of the receiver mount of FIG. 7 with the looking pin recessed into the receiver mount, according to one embodiment.

According to various aspects, the receiver mount 34 includes a foot section 90 and an engagement section 92 coupled to the foot section 90, and/or integrally formed with the foot section 90. In some examples, the foot section 90 can define one of various shapes, such as a quadrilateral shape, a rounded shape, and/or one of other shapes, and the engagement section 92 can define one of various shapes that coincides or differs from the shape of the foot section 90, such as a quadrilateral shape, a rounded shape, and/or one of other various shapes. In some aspects, the foot section 90 and the engagement section 92 can define one of various shapes and/or sizes. For example, the engagement section 92 can have a width greater than a width of the foot section 90, as illustrated in FIGS. 7 and 8. According to various aspects, the foot section 90 can be fixedly coupled and/or rotationally coupled to the body 36, and the engagement section 92 can be fixedly coupled and/or rotationally coupled to the foot section 90. In such aspects, a first end 94 of the foot section 90 can be coupled to the body 36, and a second, opposing end 96 of the foot section 90 can be coupled to the engagement section 92.

Figure 9:
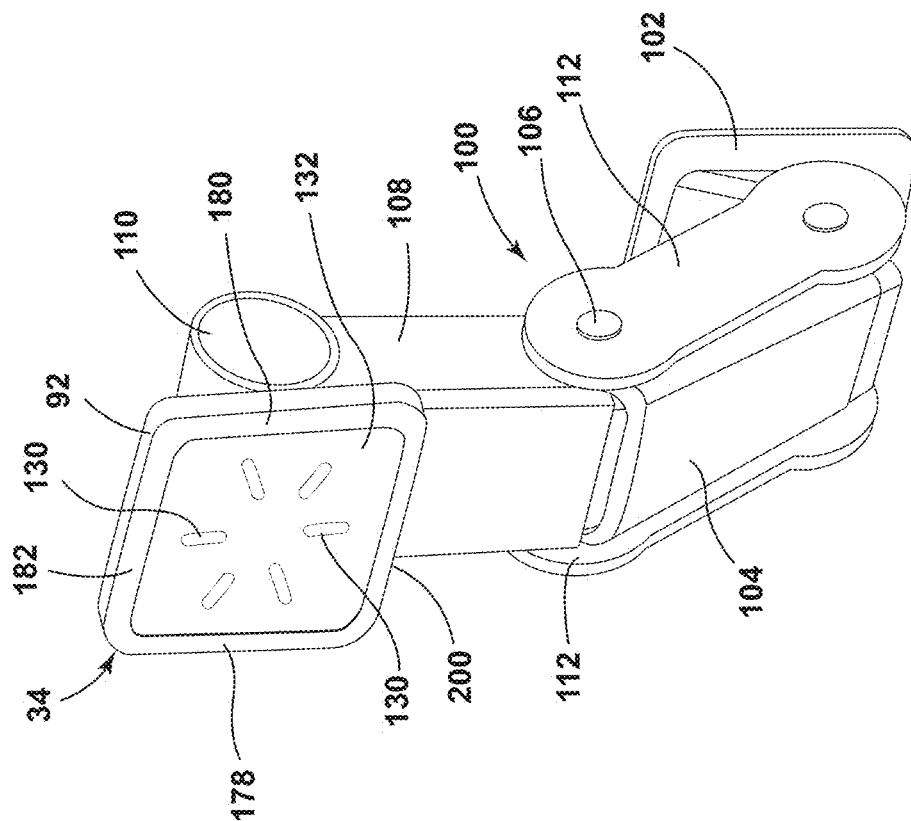
FIG. 9 is a perspective view of the receiver mount with a pivoting arm, according to one embodiment.
Figure 11:
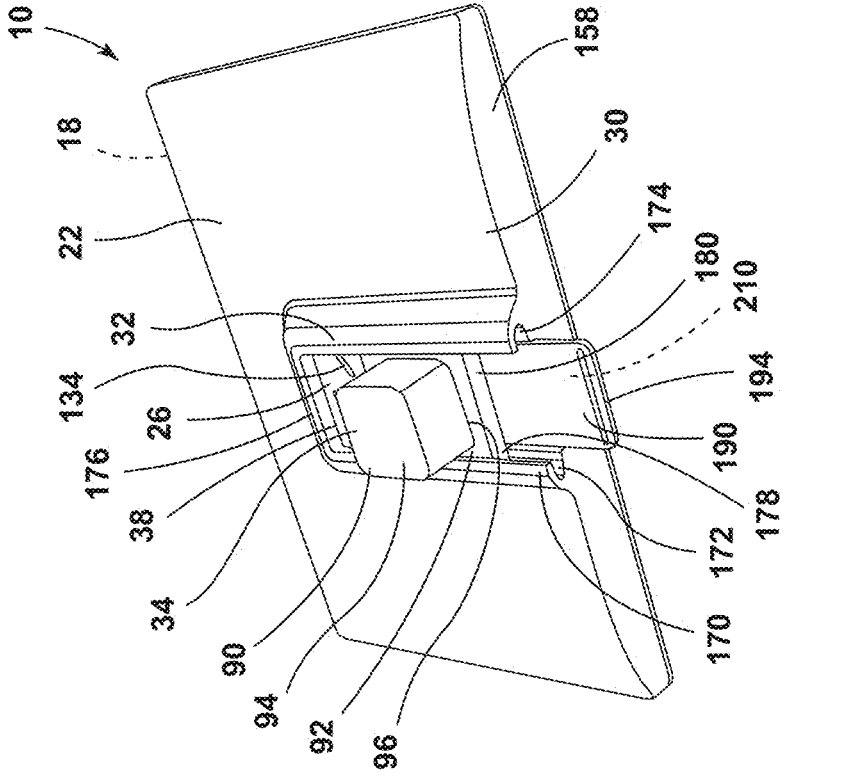
FIG. 11 is a rear perspective view of the display housing with the receiver mount slidably coupled, according to one embodiment.
Figure 10:
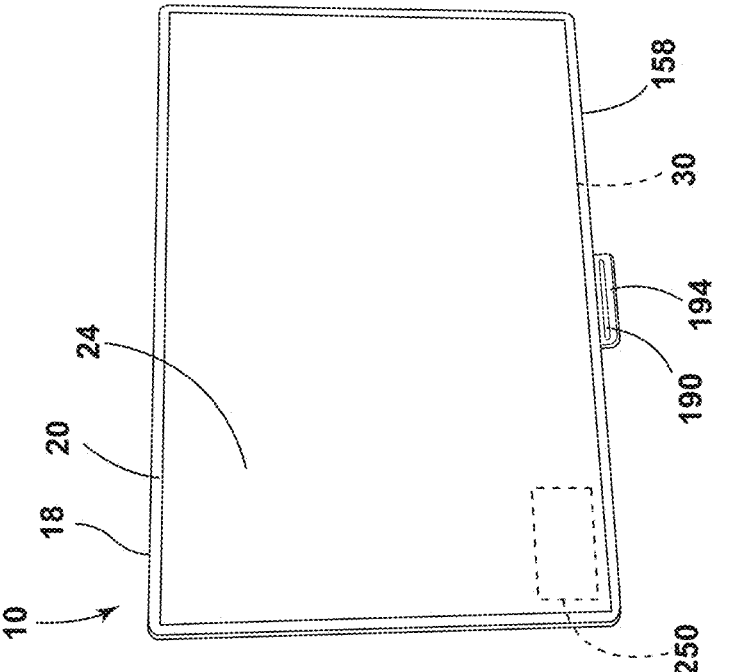
FIG. 10 is a front perspective view of the display housing, according to one embodiment.

Referring to FIGS. 5, 6 and 9, the receiver mount 34 can be coupled to the body 36 via a receiver mount arm 100. The receiver mount arm 100 may include one or more links and/or joints. For example, the receiver mount arm 100 can include a shoulder 102 coupled to the body 36, a first link 104 coupled to the shoulder 102, an elbow joint 106 coupled to the first link 104 and a second link 108, a wrist 110 coupled to the second link 108 and the receiver mount 34, and one or more receiver mount arm supports 112 coupled to opposing sides of the receiver mount arm 100. In such aspects, the number of joints and/or links, the length of the links, and/or the degree of rotation of the joints is such that the receiver mount 34 can be positioned in various positions around the vehicle 12. According to various aspects, the receiver mount arm 100 is configured to permit adjustability in the location of the display 24 throughout the vehicle 12 and in an environment external the vehicle 12, as provided herein.

In some embodiments, the vehicle 12 can include multiple receiver mounts 34 disposed within the vehicle 12. For example, the vehicle 12 can include a primary receiver mount 34A that is within the viewing area of the driver and at least one auxiliary receiver mount 34B mounted to various parts of the vehicle 12. The auxiliary receiver mount 34B can be mounted in the passenger compartment 16, a storage compartment, such as a trunk or truck bed, a side cargo area, such as storage compartments built above the wheel wells of vehicle 12, or a front storage compartment, such as a frunk. on a hinged door or lid of the vehicle 12, such as a vehicle door, a trunk door, or a hood, and/or on the vehicle exterior, such as a roof or exterior body of the vehicle.

Referring again to FIGS. 7, 8 and 13-16, the receiver mount 34 may define a locking pin recess 120 on the engagement section 92. In some examples, the locking pin recess 120 is defined on the engagement section 92 and at least partially extends to the first end 94 of the foot section 90. According to various aspects, the locking pin recess 120 is configured to receive a locking pin 122 of the device assembly 10, as provided herein.

Referring further to FIGS. 7, 9 and 13-16, the receiver mount 34 includes a receiver mount connection pin 130 disposed on the engagement section 92 of the receiver mount 34. In some examples, the receiver mount connection pin 130 is disposed on an outer surface 132 of the engagement section 92. In other examples, the receiver mount 34 includes a plurality of receiver mount connection pins 130 disposed around the locking pin recess 120. In such examples, the number and/or placement of the receiver mount connection pins 130 can coincide, or differ from, the placement and number of one or more housing connection pins 134 that can be disposed on the display housing 18, as provided herein. According to various aspects, the receiver mount connection pins 130 are configured to engage with the housing connection pins 134. In some aspects, the receiver mount connection pins 130 can couple to the housing connection pins 134 via a magnetic connection and/or via one or more various interlock engagements. In other aspects, the engagement between the receiver mount connection pins 130 and the housing connection pins 134 is such that data transfer can occur between one or more controllers 44 disposed in the vehicle 12 and between the display 24, as provided herein. For example, the receiver mount connection pins 130 and the housing connection pins 134 can be comprised of a conductive material that permits the transmission of electricity and digital signals across the engagement between the receiver mount connection pins 130 and the housing connection pins 134.

Referring now to FIGS. 10-16, the display assembly 10 includes the display housing 18 that is coupled to the receiver mount 34. The display housing 18 includes the rear portion 22, the front portion 20 opposing the rear portion 22, and a bottom portion 30 between the rear portion 22 and the front portion 20. The display housing 18 can define one of various shapes, such as a quadrilateral shape, a rounded shape, and/or one of various other shapes. In some aspects, the shape and/or size of the display housing 18 coincides, or differs from, the shape and/or size of the display 24 and/or the receiver mount 34. According to various aspects, the display housing 18 is configured to house the display 24 and couple to the receiver mount 34. In some aspects, the display housing 18 is configured to rotationally couple to the receiver mount 34 and/or fixedly couple to the receiver mount 34. For example, the display housing 18 can be rotationally coupled to the receiver mount 34 such that the display housing 18 with the display 24 can be rotated between a portrait and landscape orientation. In yet other aspects, the display housing 18 can be couplable to a plurality of receiver mounts 34. For example, the display housing 18 can be couplable to a primary receiver mount 34a disposed in the passenger compartment 16, and an auxiliary receiver mount 34b disposed in the front trunk 70 of the vehicle 12.

As illustrated in FIGS. 11-16, the receiver 26 is coupled to the rear portion 22 of the display housing 18. In some examples, the receiver 26 is integrally formed on the rear portion 22. The receiver 26 may protrude outward from an axis normal an outer surface 152 of the rear portion 22. The receiver 26 defines one of various sizes and/or shapes that permit coupling to the receiver mount 34. For example, the receiver 26 may define a quadrilateral shape, a rounded shape, and/or one of other various shapes that coincides with, or differs, from a shape and/or size of the receiver mount 34. In other embodiments, the receiver 26 may have the receiver recess 28 on the outer surface 152 of the rear portion 22 that permits insertion of the receiver mount 34. The receiver recess 28 can have a shape and/or size that coincides and/or differs from the shape and/or size of the receiver mount 34. In some examples, the receiver recess 28 is defined on a center section 32 of the rear portion 22. In other examples, the receiver recess 28 extends from an outer edge 158 of the display housing 18 that is proximate the bottom portion 30 and towards the center of the rear portion 32. In such examples, the extension of the receiver recess 28 from the outer edge 158 and towards the center of the rear portion 32 defines a coupling path.

As shown in FIGS. 11-16, the receiver recess 28 may have one or more grooves 170 on one or more opposing sides of the receiver recess 28. In some examples, the receiver recess 28 defines a general U-shape with a first groove 172, a second groove 174 opposing the first groove 172, and a third groove 176 extending between the first groove 172 and the second groove 174, all of which are collectively referred to herein as the grooves 170. The grooves 170 defined along the opposing sides of the receiver recess 28 may define a shape that permits insertion of the receiver mount 34 into the grooves 170. For example, opposing side segments 178, 180 defined on the engagement section 92 of the receiver mount 34 can have a shape that is slightly undersized relative to the grooves 170 such that the opposing side segments 178, 180 can be inserted into, and slide along, the first groove 172 and the second groove 174, until a top segment 182 of the engagement section 92 is inserted into the third groove 176. According to various aspects, the grooves 170 can extend over the opposing side segments 178, 180 and the top segment 182 and abut an inner surface 184 of the engagement section 92 such that the display housing 18 cannot be pulled directly away from the receiver mount 34 in a direction perpendicular to the outer surface 132 of the engagement section 92. In so doing, the grooves 170 may prevent the receiver mount 34 from detaching from the receiver 26 without reversing course along the coupling path.

Referring again to FIGS. 10-16, The receiver 26 can include a release lever 190 disposed in the receiver recess 28. In various aspects, the release lever 190 can be coupled, such as pivotably coupled, to the rear portion 22 of the display housing 18. The release lever 190 can include an engagement portion 192 and a handle 194 opposing the engagement portion 192. In various aspects, the release lever 190 can define a quadrilateral shape, such as an elongated rectangular shape, or one of other various shapes. In some examples, the release lever 190 can be disposed in the receiver recess 28 such that the handle 194 extends beyond the bottom portion 30 of the display housing 18 and the engagement portion 192 is proximate the center of the rear portion 32.

As illustrated in FIGS. 11-16, release lever 190 has a stowed position and an engaged position. In the stowed position, the release lever 190 is decoupled from the receiver mount 34. In the engaged position, the release lever 190 is coupled to the receiver mount 34 such that the engagement portion 192 is coupled to a bottom segment 200 of the engagement section 92 of the receiver mount 34. According to various aspects, the release lever 190 can move from the engaged position to the stowed position by grasping the handle 194 and exerting a pulling force such that the engagement portion 192 decouples from the bottom segment 200 of the engagement section 92. Additionally, the release lever 190 can then move from the stowed position to the engaged position by exerting a pushing force such that the engagement portion 192 couples to the bottom segment 200. In such aspects, it is generally contemplated that the release lever 190 can include one or more biasing elements that bias the release lever 190 towards the stowed position and/or the engaged position. For example, the release lever 190 can include one or more spring elements that bias the release lever towards the engaged position. It is further generally contemplated that the insertion of the receiver mount 34 into the receiver 26 can bias the release lever 190 towards the engaged position.

The release lever 190 is configured to operably couple to the receiver mount 34, thereby fixedly coupling the receiver mount 34 to the receiver 26 and preventing the receiver mount 34 from decoupling along the coupling path. In some embodiments, the release lever 190 fixedly couples to the receiver mount 34 via engagement between the engagement portion 192 of the release lever 190 and the bottom segment 200 of the engagement section 92. In other aspects, the release lever 190 physically blocks the receiver mount 34 from decoupling along the coupling path. In various examples, the receiver recess 28 further defines one or more release lever channels 210 that stow the release lever 190 when the release lever 190 is in the stowed position. In such examples, when the release lever 190 is in the stowed position, the receiver mount 34 may pass over the release lever 190 during a sliding coupling/decoupling of the receiver mount 34 to the receiver 26.

Referring now to FIGS. 7, 8 and 13-16, the receiver mount 34 can be operably coupled to the receiver 26 via the locking pin 122. In some examples, the locking pin 122 is operably disposed within the locking pin recess 120. In some examples, the locking pin 122 can be operably disposed within a locking pin housing 220 that is then disposed within the locking pin recess 120. In such examples, the locking pin housing 220 may have a shape and/or size that is slightly oversized relative to the locking pin 122 such that the locking pin 122 can be housed within the locking pin housing 220.

According to various aspects, the locking pin 122 is movable between a locked position 230 and an unlocked position 232. In the locked position 230, the locking pin 122 extends outward from the locking pin recess 120 and into a receiver pin recess 234 that is defined on the receiver 26 and extends towards the front portion 20 of the display housing 18. In such aspects, the receiver pin recess 234 can have a shape and/or size slightly oversized relative to the locking pin 122 such that the locking pin 122 can extend into the receiver pin recess 234. When the locking pin 122 is in the locked position 230, the receiver mount 34 can be fixedly coupled to the receiver 26 due to the extension of the locking pin 122 into the receiver pin recess 234 and due to the abutment between the grooves 170 and the receiver mount 34. In the unlocked position 232, the locking pin 122 is retracted from the receiver pin recess 234. The locking pin 122 can be retraced from the receiver pin recess 234 such that the locking pin 122 is recessed from, or flush with, the outer surface 132 of the engagement section 92 of the receiver mount 34. In the unlocked position 232, the locking pin 122 is distal from the receiver 26 such that the receiver mount 34 can be slid out of the receiver 26, in various aspects. Additionally, or alternatively, the locking pin 122 can be coupled to an actuator, such as a mechanical, electrical, or electro-mechanical actuator. In such aspects, the actuator can be configured to actuate the locking pin 122 between the locked position 230 and the unlocked position 232. For example, the controller 44 can be in communication with the actuator such that the controller 44 can output a signal that actuates the locking pin 122 between the locked position 230 and the unlocked position 232.

Referring now to FIGS. 12-16, the display housing 18 includes the housing connection pin 134. In some examples, the housing connection pin 134 is disposed on the rear portion 22 and/or the receiver 26 of the display housing 18. In some examples, the housing connection pin 134 is disposed on a back surface 240 of the receiver 26. In other examples, the display housing 18 includes a plurality of housing connection pins 134 disposed around the receiver pin recess 234. In such examples, the number and/or placement of the housing connection pins 134 can coincide, or differ from, the placement and number of one or more receiver mount connection pins 130 that can be disposed on the receiver mount 34, as provided herein. In various aspects, each housing connection pin 134 and each receiver mount connection pin 130 can define one of various shapes, such as a quadrilateral shape, a rounded shape, or one of various shapes. Additionally, each housing connection pin 134 and each receiver mount connection pin 130 can be disposed proximate, and/or at least partially encircle the locking pin recess 120 and the receiver pin recess 234, respectively.

According to various aspects, the housing connection pins 134 are configured to engage with the receiver mount connection pins 130. In some aspects, the housing connection pins 134 can couple to the receiver mount connection pins 130 via a magnetic connection and/or via one or more various interlock engagements. In other aspects, the engagement between the housing connection pins 134 and the receiver mount connection pins 130 is such that data transfer can occur between one or more controller disposed in the vehicle 12 and between the display 24, as provided herein. For example, the housing connection pins 134 and the receiver mount connection pins 130 can be comprised of a conductive material that permits the transmission of electricity and digital signals across the engagement between the housing connection pins 134 and the receiver mount connection pins 130.

According to various aspects, the engagement between the receiver 26 and the receiver mount 34 can define the interlock connection 38 between the receiver 26 and the receiver mount 34. The interlock connection 38 can at least partially be defined by the engagement between the grooves 170 and the engagement section 92 of the receiver mount 34, the engagement between the locking pin 122 and the receiver pin recess 234, the engagement between the lever 190 and the engagement section 92, and/or the engagement between the housing connection pins 134 and the receiver mount connection pins 130. According to various aspects, the interlock connection, via the various engagements, defines a locked condition 40 and an unlocked condition 42. In the locked condition 40, the display housing 18 with the display 24 is fixedly coupled to the receiver mount 34. In the unlocked condition 42, the display housing 18 with the display 24 is decouplable from the receiver mount 34. According to various aspects, the controller 44 can be configured to toggle between the locked condition 40 and the unlocked condition 42, wherein the toggling between the two conditions 40, 42 is at least partially based on a condition of the vehicle 12 and/or a user in or near the vehicle 12.

Referring now to FIGS. 10 and 13-16, the display 24 is coupled to the front portion 20 of the display housing 18. In some examples, the display 24 can be coupled to the front portion 20 and at least partially recessed into the front portion 20 such that a bezel extends along an outer periphery of the display. In various aspects, the display 24 can have a shape and/or size that coincides with the shape and/or size of the display housing 18. For example, the display 24 can define a generally quadrilateral shape that coincides with a quadrilateral shape of the display housing 18. Additionally, it is generally contemplated that the display 24 can define various other shapes, such as a rounded shape. It is further generally contemplated that the display 24 can be a number of displays, such as a touch display, a light-emitting diode (LED) display, a liquid crystal display (LCD), a touch display, and/or one of other various kinds of displays. Additionally, it is generally contemplated that a plurality of displays 24 can be coupled to the display housing 18. In such aspects, the plurality of displays can function as a single display or as a plurality of displays projecting differing, or coinciding, images.

According to various aspects, the display 24 is configured to be in communication with the controller 44 such that the display 24 can receive outputs from the controller 44. In some examples, the display 24 is configured to project an image and/or a video in response to a signal sent from the controller 44. For example, the display 24 can be configured to play a video in response to a signal sent from the controller 44. In some aspects, the display 24 can be configured to orient the projected images or display depending on an orientation of the display 24 and/or the display housing 18. For example, the display 24 can be configured to orient the projected images and videos in a portrait orientation when the display 24 and display housing 18 are rotated to a first position, and the display 24 can be configured to orient the projected images and videos in a landscape orientation when the display 24 and the display housing 18 are rotated to a second position.

Additionally, it is generally contemplated in aspects where the display 24 is a touch display that the display 24 can be configured to output a signal to the controller 44. For example, a user, while operating the display, may touch the screen to open a video file. The display 24 can be configured such that a signal is sent to the controller 44 in response to the touch input. The controller 44, in return, may be configured to open the video file and output a signal to the display 24 to project the video. It is further generally contemplated that the display 24 can be configured as a user interface, a gauge cluster, and/or other various displays found in or near a vehicle 12. Furthermore, it is generally contemplated that the display 24 can be configured to function as a user interface, a gauge cluster, and/or another display depending on the location of the display 24 in the vehicle 12. Further still, it is generally contemplated that the display 24 can be configured to display the status and provide as a user interface for various vehicle functions, such as a heating, ventilation, and air conditioning (HVAC) system, a media system, and/or other various vehicle systems.

According to various aspects, a power supply 250 can be disposed within the display housing 18. In such examples, the power supply 250 may be disposed within the display housing 18 and be in electrical communication with the display 24. For example, the power supply 250 may be configured as a portable battery that is in electrical communication with the display 24. According to various aspects, the power supply 250 is configured to power the display 24 when the display housing 18 is decoupled from the receiver mount 34. For example, the display 24 can be configured such that a vehicle power supply is configured to power the display 24 when the display housing 18 is coupled to the receiver mount 34, and the power supply 250 is configured to power the display 24 when the display housing 18 is decoupled from the receiver mount 34.

According to various aspects, the assembly 10 includes the controller 44. The controller 44 can be disposed in various locations throughout the vehicle 12, or the controller 44 can be disposed in the display housing 18. The controller 44 may include a microprocessor and/or other analog and/or digital circuitry for processing one or more routines stored in memory. In some examples, the controller 44 may be a stand-alone dedicated controller or may be a shared controller 44 integrated with other control functions, such as a controller integrated with the sensor system 260 and other conceivable on-board or off-board vehicle control systems. It should be appreciated that operations processed by the controller 44 may be processed by one or more other controllers of the vehicle 12. For example, the vehicle 12 may include a controller area network (CAN) bus and the vehicle 12 may include a plurality of controllers, such as a controller disposed within the vehicle 12, a controller disposed within the display housing 18, and other various controllers, wherein any of which may process a portion or all of the operations processed by the controller 44.

The controller 44 can be configured to be in communication with a sensor system 260. In some embodiments, the sensor system 260 includes a plurality of sensors, such as touch sensors, proximity sensors, visual sensors (e.g., cameras, surround view camera, etc.), radar sensors, lidar sensors, ultrasonic sensors, lasers, thermal sensors, accelerometers, magnetometers, gyroscopes and/or various other sensors. In such embodiments, the sensors can be disposed in various locations throughout the vehicle 12, in an environment external the vehicle 12, and/or in the device assembly 10. For example, the device assembly 10 can include an accelerometer, magnetometer, and/or a gyroscope disposed in the display housing 18. It is further contemplated that, in some embodiments, one or more of the plurality of sensors from the sensor system 260 may be coupled to the device assembly 10 and/or disposed proximate to the device assembly 10, in addition to one or more sensors coupled to the vehicle 12. The sensor system 260 may be configured to provide sensor inputs to the controller 44. In various embodiments, the data collected from the plurality of sensors in the sensor system 260 may be utilized to monitor a placement of the device assembly 10 in the vehicle 12 or in an environment external the vehicle 12. Further, the data collected from the sensor system 260 may be utilized to monitor an orientation of the display 24, a user interacting with the display 24, a dynamic state of the vehicle 12, a static state of the vehicle 12, an on/off state of the vehicle 12, and/or one or more users approaching the vehicle 12.

The controller 44 can be configured to be in communication with various components of the device assembly 10. For example, the controller 44 may be in communication with an actuator of the locking pin, the power source of the display 24, the display 24, and/or various other aspects of the device assembly 10. In such examples, the controller 44 can be configured to output various signals to the device assembly 10 in response to data provided by the sensor system 260.

According to various aspects, the controller 44 can be configured to actuate the locked condition 40 of the interlock connection in response to data provided by the sensor system 260. For example, the controller may output a signal to actuate the locking pin 122 after determining that the vehicle 12 is in a dynamic state. Additionally, the controller 44 may determine the dynamic state of the vehicle 12 via various vehicle aspects, such as shifting away from park or a neutral gear, shifting to a reverse, neutral, or drive gear, camera and/or radar sensors that detect vehicle motion, a tachometer that senses the engine rotation is at or above a set threshold, or a speedometer that senses the rotation of a driveshaft, axle, or wheel and determines that the vehicle speed or is at or above a set threshold. Further, the locked condition 40 may be triggered when the controller senses that the vehicle 12 is no longer in a powered off state.

In some aspects, despite being in an otherwise static state, the locked condition 40 may further be triggered to prevent unauthorized use of the display housing 18. In some embodiments, the locked condition 40 may be triggered when the controller 44 senses an unauthorized use of the device assembly 10, such as when the user has left the vicinity of the vehicle 12 or is unlikely to decouple the display housing 18. This unauthorized use may be determined in some examples by at least one of sensing that an unauthorized user has entered the vehicle 12 via the vehicle cameras, when the controller the vehicle 12 has been powered off for a set threshold amount of time, or when the controller 44 senses that the doors locks have been engaged.

In some embodiments, the locked condition 40 may have a manual override such that a vehicle occupant may trigger the interlock connection 38 to move from the locked condition 40 to an unlocked condition 42. This manual override may include a physical button or a lever, such as the release lever 190 on the display housing 18. Alternatively or additionally, the override may be achieved by interfacing with the display 24 of the display housing 18.

Figure 12:
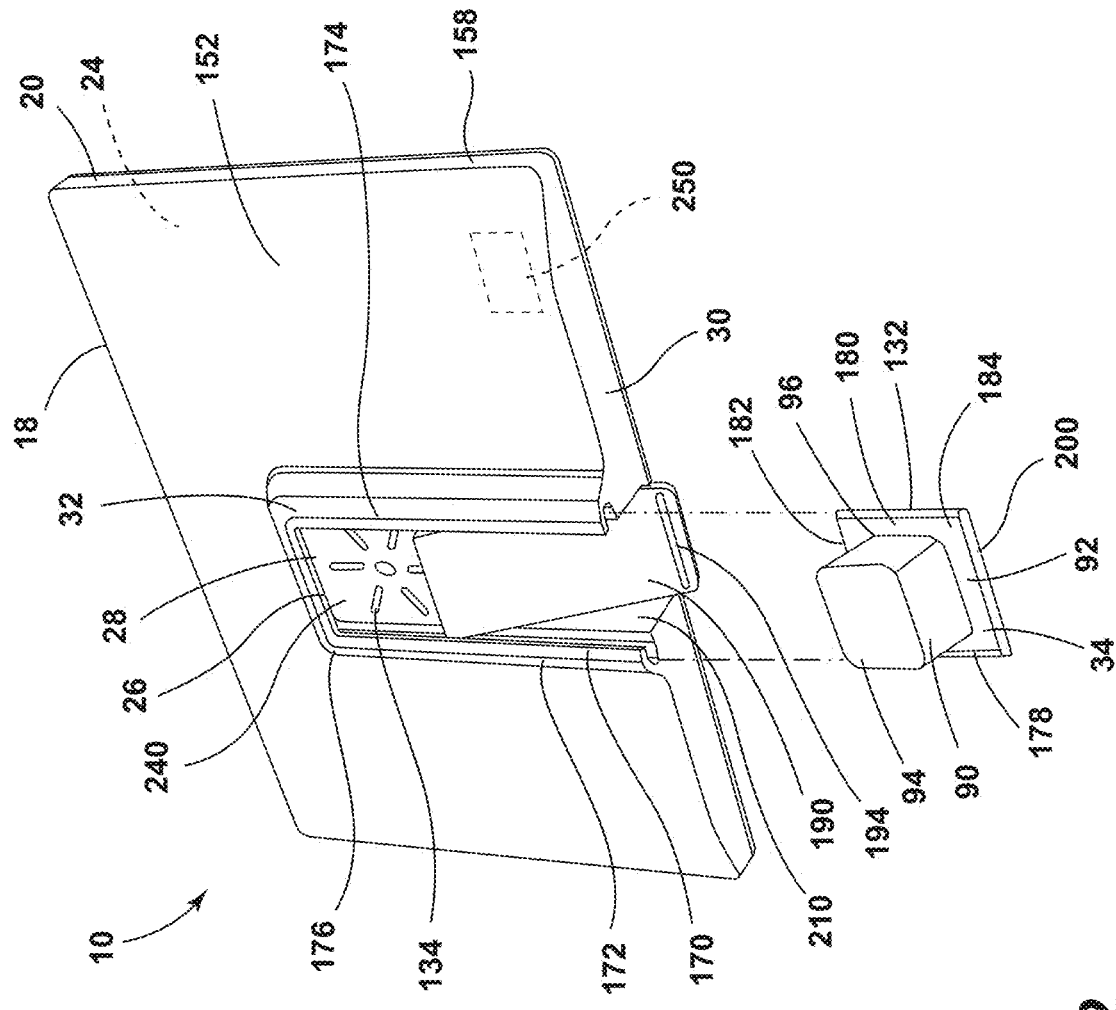
FIG. 12 is a rear perspective view of the display housing with the receiver mount slidably decoupled, according to one embodiment.
Figures 13, 14, 15:
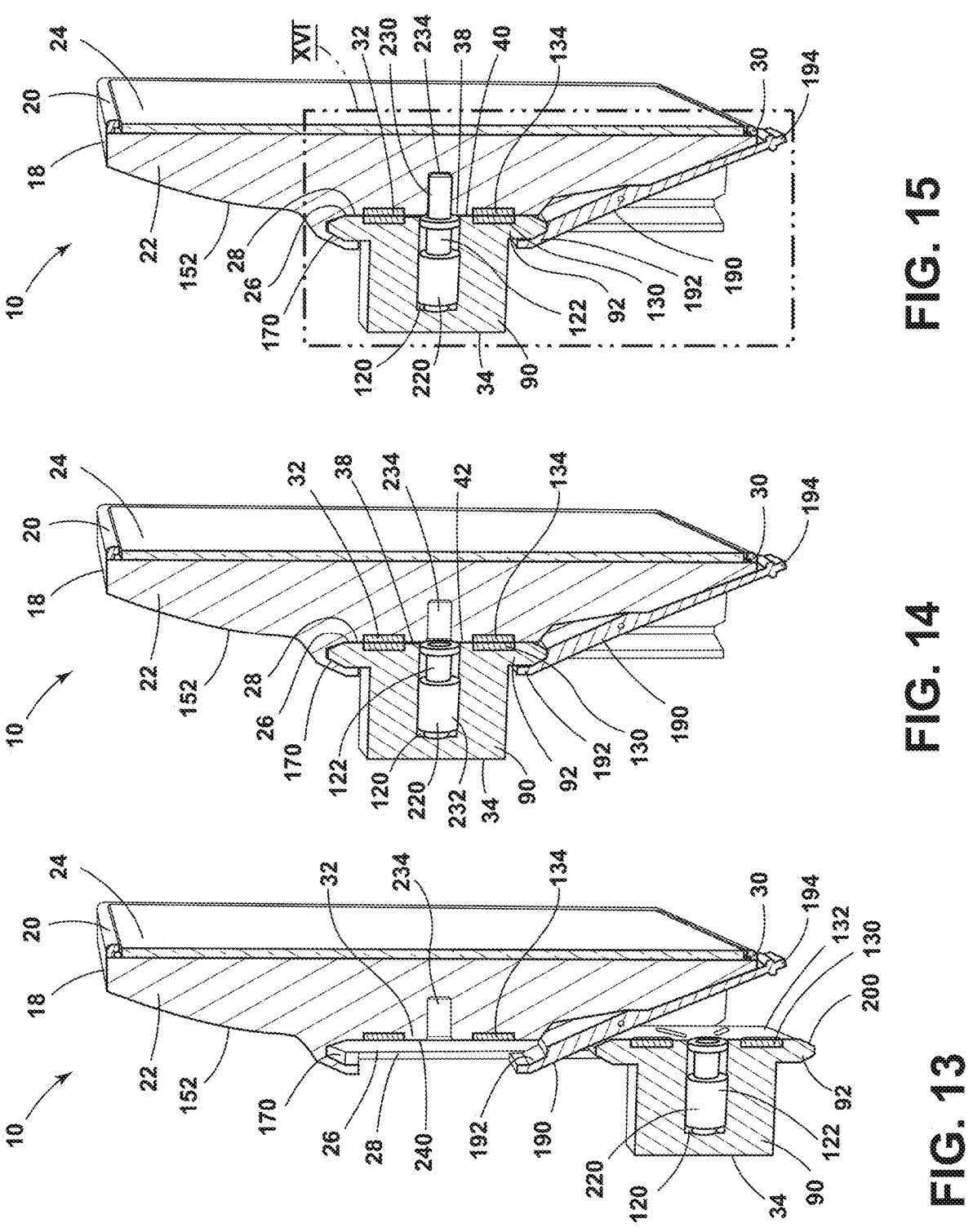
FIG. 13 is a side cross-sectional perspective of the display housing with the receiver mount slidably decoupled and the interlock disengaged, according to one embodiment.
FIG. 14 is a side cross-sectional perspective of the display housing with the receiver mount slidably coupled and the interlock disengaged, according to one embodiment.
FIG. 15 is a side cross-sectional perspective of the display housing with the receiver mount slidably coupled and the interlock engaged, according to one embodiment.
Figure 16:
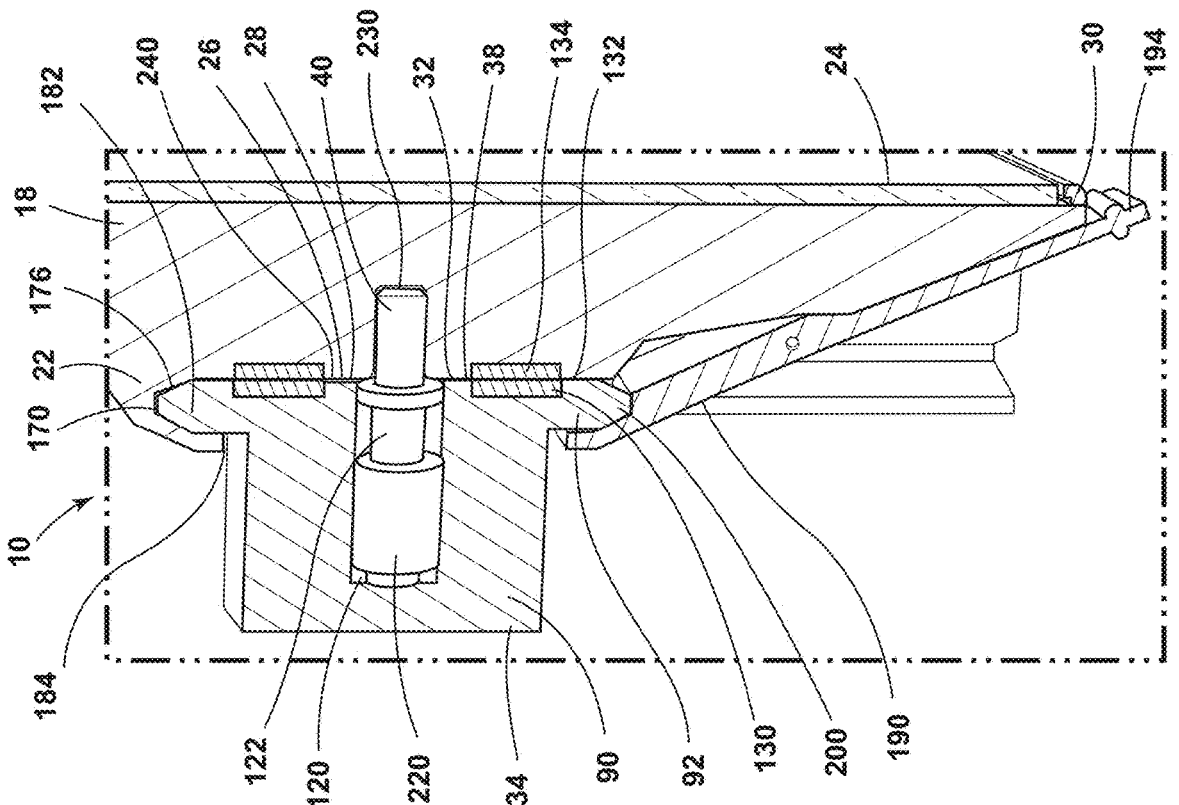
FIG. 16 is a zoomed in perspective of a side cross-sectional view of FIG. 14 showing the display housing with the receiver mount slidably coupled and the interlock engaged, according to one embodiment.

The unlocked condition 42 of the interlock connection 38 may include any process or component that can reversibly enable the decoupling of receiver 26 from receiver mount 34. As shown in FIGS. 3, 12 and 13, the unlocked condition 42 of the interlock connection 38 may occur via actuation of the locking pin 122 such that the locking pin 122 no longer extends into the receiver pin recess 234. The unlock condition 42 may also be automatically triggered when the controller 44 determines that the vehicle 12 is in a static state. The controller 44 may determine the static state via detection of various aspects, such as the vehicle 12 shifting into park or a neutral gear, shifting away from a reverse, neutral, or drive gear, camera and/or radar sensors that do not detect vehicle motion, a tachometer that senses the engine rotation is below a set threshold, or a speedometer that senses the rotation of a driveshaft, axle, or wheel and determines that the vehicle speed or is at or below a set threshold.

According to various aspects, the unlocked condition 42 may be actuated by the controller 44 to allow removal of the display housing 18 upon detection of an authorized use. In some embodiments, the controller 44 may determine an authorized use when a determined authorized user is within a defined proximity of the vehicle 12, or when an authorized user is likely to decouple the display housing. Additionally, it is generally contemplated that the controller 44 may be in communication with other devices (i.e., a Bluetooth® connection, radio frequency identification) or receive additional data to determine whether a user is an authorized user or whether the vehicle 12 is in a dynamic state or a statis state.

Use of the presently disclosed device may provide for a variety of advantages. For example, the device assembly 10, by having the display housing 18 with the display 24, provides for an interior vehicle display that can be positioned in various locations throughout the vehicle 12. In particular, the display housing 18, by being couplable to a plurality of receiver mounts 34, such as a primary receiver mount 34a and auxiliary receiver mounts 34b, provides for a display 24 that can be positioned in various locations throughout the passenger compartment 16 and in various other locations of the vehicle 12, such as the front trunk 70, the rear trunk, and/or a side panel of the vehicle 12. Further, the device assembly 10, by having a rotational coupling between the display housing 18 and the receiver mount 34 in some aspects, permits a display 24 that can be rotated to a desired position by a user. Additionally, the device assembly 10, by incorporating the interlock connection 38 that can be manually actuated, or actuated by the controller 44 (e.g., via communication with a locking pin 122 actuator), provides for a display 24 that can be fixedly coupled or removably coupled to the receiver mount 34, depending on various conditions (e.g., a dynamic state or a static state of the vehicle 12).

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A device assembly of a vehicle, comprising:
   a display housing including a front portion and a rear portion opposing the front portion;
   a display coupled to the front portion;
   a receiver disposed on the rear portion, wherein the receiver is couplable to a receiver mount that is coupled to the vehicle; and
   an interlock connection defined between the display housing and the receiver mount, wherein the interlock connection has a locked condition, the locked condition preventing the display housing from being slidably decoupled when the vehicle is in a dynamic state, and wherein the interlock connection has an unlocked condition, the unlocked condition allowing the display housing to be slidably decoupled when the vehicle is in a static state.

2. The device assembly of claim 1, further comprising:
   at least one housing connection pin disposed on the rear portion; and
   at least one receiver mount connection pin disposed on the receiver mount, wherein the at least one receiver mount connection pin is configured to engage with the at least one housing connection pin, thereby permitting data transfer along the engagement, and wherein the engagement between the at least one receiver mount connection pin and the at least one housing connection pin defines the interlock connection.

3. The device assembly of claim 1, wherein the receiver slidably couples with the receiver mount through a receiver recess defined on a central region of the rear portion, and wherein the receiver recess extends from one edge of the rear portion towards a center section of the rear portion.

4. The device assembly of claim 3, further comprising:
   a release lever disposed within the receiver recess, the release lever being movable between an engaged position and a disengaged position, wherein the release lever includes a handle that extends beyond a bottom portion of the display housing.

5. The device assembly of claim 1, further comprising:
   a locking pin coupled to the receiver mount, the locking pin being movable between a locked position and an unlocked position, wherein the locking pin extends into a receiver pin recess that is defined on the rear portion of the display housing.

6. The device assembly of claim 5, wherein the locking pin is recessed into the receiver mount in the unlocked position, and wherein an engagement between the locking pin and the display housing defines the interlock connection.

7. A device assembly of claim 1, wherein the receiver mount comprises at least one of a primary receiver mount or an auxiliary receiver mount, and wherein the primary receiver mount is disposed in an interior of the vehicle, and wherein the auxiliary receiver mount is couplable to front storage compartment or a rear storage compartment of the vehicle, and wherein an engagement between the display housing and the primary receiver mount defines a first interlock connection and the engagement between the display housing and the auxiliary receiver mount defines a second interlock connection.

8. The device assembly of claim 1, further comprising a receiver mount arm couplable to the receiver mount, wherein the receiver mount arm includes at least one pivot joint.

9. A device assembly of a vehicle, comprising:
a display housing including a front portion and a rear portion opposing the front portion;
a display coupled to the front portion;
a receiver disposed on the rear portion, wherein the receiver comprises a receiver recess extending from one edge of the rear portion towards a center section of the rear portion, wherein the receiver is configured to be slidably coupled to a receiver mount coupled to a vehicle;
an interlock connection between the display housing and the receiver mount, wherein the interlock connection has a locked condition, the locked condition preventing the display housing from being slidably decoupled when the vehicle is in a dynamic state, and wherein the interlock connection has an unlocked condition, the unlocked condition allowing the display housing to slidably decoupled when the vehicle is in a static state; and
a controller in communication with the interlock connection, wherein the controller is configured to output a signal to actuate the interlock connection to a locked condition in response to a detected dynamic state of the vehicle, and wherein the controller is configured to output a signal to actuate the interlock connection to an unlocked condition in response to a detected static state of the vehicle.

10. The device assembly of claim 9, further comprising:
at least one housing connection pin disposed on the rear portion; and
at least one receiver mount connection pin disposed on the receiver mount, wherein the at least one receiver mount connection pin is configured to engage with the at least one housing connection pin, thereby defining the interlock connection, and wherein the engagement between the at least one housing connection pin and the at least one receiver mount connection pin permits data transfer along the engagement.

11. The device assembly of claim 9, further comprising:
a release lever disposed within the recess movable between an engaged position and a disengaged position, wherein the release lever includes a handle that extend beyond a bottom portion of the housing.

12. The device assembly of claim 9, further comprising:
a locking pin coupled to the receiver mount, the locking pin being movable between a locked position and an unlocked position, wherein the locking pin extends into a receiver pin recess that is defined on the rear portion of the display housing.

13. A device assembly of claim 12, wherein an engagement between the locking pin and the display housing defines the interlock connection, and wherein the controller is configured to actuate the controller to the locked position to define the locked condition, and wherein the controller is configured to actuate the locking pin to the unlocked position to define the unlocked condition.

14. A device assembly of claim 9, wherein the receiver mount comprises at least one of a primary receiver mount or an auxiliary receiver mount, and wherein the primary receiver mount is disposed in an interior of the vehicle, and wherein the auxiliary receiver mount is couplable to front storage compartment or a rear storage compartment of the vehicle, and wherein an engagement between the display housing and the primary receiver mount defines a first interlock connection and the engagement between the display housing and the auxiliary receiver mount defines a second interlock connection.

15. The device assembly of claim 9, further comprising a receiver mount arm coupled to the receiver mount.

16. The device assembly of claim 15, wherein the receiver mount arm includes a shoulder coupled to the vehicle, a first link coupled to the shoulder, an elbow joint coupled to the first link and a second link, and a wrist coupled to the second link and the receiver mount.

17. The device assembly of claim 15, wherein the receiver mount arm includes a pair of receiver mount arm supports on opposing sides of the receiver mount arm.

18. A device assembly of a vehicle, comprising:
a display housing including a front portion and a rear portion opposing the front portion;
a display coupled to the front portion;
a receiver disposed on the rear portion,
at least one housing connection pin disposed on the receiver;
a receiver mount couplable to the receiver, the receiver mount coupled to the vehicle;
at least one receiver mount connection pin disposed on the receiver mount, wherein the at least one receiver mount connection pin is configured to engage with the at least one housing connection pin; and
a controller in communication with the at least one housing connection pin and the at least one receiver mount connection pin, wherein the controller is configured to output a first signal to at least one of the at least one receiver mount connection pin or the at least one housing connection pin to define a fixed engagement between the at least one receiver mount connection pin and the housing connection pin in response to a first condition, and wherein the controller is configured to output a second signal to at least one of the at least one receiver mount connection pin or the at least one housing connection pin to define a decouplable engagement between the at least one receiver mount connection pin and the housing connection pin in response to a second condition, wherein the controller is configured to determine the first condition in response to at least one of a static state of the vehicle or a detected authorized use condition, and wherein the controller is configured to determine the second condition in response to at least one of a detected dynamic state of the vehicle or a detected unauthorized use condition.

19. The device assembly of claim 18, further comprising:

a release lever disposed on rear portion of the display housing, wherein the release lever includes a handle extending beyond a bottom portion of the display housing and an engagement section opposing the handle, and wherein the engagement section is couplable to a bottom segment of the receiver mount.

20. The device assembly of claim 18, further comprising:

a locking pin coupled to the receiver mount, the locking pin being movable between a locked position and an unlocked position, wherein the locking pin extends into a receiver pin recess that is defined on the rear portion of the display housing, and wherein the controller is configured to actuate the locking pin to the locked position in response to the first condition, and wherein the controller is configured to actuate the locking pin to the unlocked position in response to the second condition, and wherein the locking pin is recessed into the receiver mount in the unlocked position and the locking pin is extended into the rear portion of the display housing in the locked position.

\* \* \* \* \*